(12) United States Patent
Liu et al.

(10) Patent No.: US 6,799,909 B2
(45) Date of Patent: Oct. 5, 2004

(54) METHOD OF PROVIDING FOR AN AUTOMATED SPLIT RUNCARD PROCESSING

(75) Inventors: Chih Pang Liu, Hsinchu (TW); Hao Ming Gong, Hsinchu (TW); Wei Yao Lin, Hsinchu (TW); Hsien Jung Hsu, Hsinchu (TW); Hsiao Lung Chu, Hsinchu (TW); I-Chun Chen, Hsinchu (TW); Tse An Chou, Hsinchu (TW); Larry Jann, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 10/408,082

(22) Filed: Apr. 4, 2003

(65) Prior Publication Data

US 2004/0115842 A1 Jun. 17, 2004

Related U.S. Application Data

(60) Provisional application No. 60/432,479, filed on Dec. 11, 2002.

(51) Int. Cl.$^7$ .................................................. G03D 5/00
(52) U.S. Cl. ........................................................ 396/611
(58) Field of Search ........................... 396/611; 438/52; 414/757, 331; 118/719

(56) References Cited

U.S. PATENT DOCUMENTS 6,290,405 B1 * 9/2001 Ueda ........................... 396/611

* cited by examiner

Primary Examiner—John F. Niebling
Assistant Examiner—Andre' C. Stevenson
(74) Attorney, Agent, or Firm—Slater & Matsil, L.L.P.

(57) ABSTRACT

A method of providing fully automated processing of a Split Lot of wafers to manufacture semiconductor devices is provided. The method processes a test Lot of wafers with a production Lot. Processing of both Lots continue as a single Lot along the production processing path up to a split condition process. Processing of the production Lot is put on hold until the alternate processing or test Lot processing is completed. The two Lots are then merged and processed according to the original predefined process steps continue on both Lots.

14 Claims, 4 Drawing Sheets

| 40 | CONDITION 1 | RECIPE A | WAFER ID's 1,3,5,7,9 |
|---|---|---|---|
| 42 | CONDITION 2 | RECIPE B | WAFER ID's 2,4,6,8,10 |
| 44 | CONDITION 3 | RECIPE C | WAFER ID's 2,4,6,8,10 |
| 46 | CONDITION 4 | RECIPE D | WAFER ID's 1,2,3,4,5,6,7,8,9,10 |

METHOD OF PROVIDING FOR AN AUTOMATED SPLIT RUNCARD PROCESSING

This application claims the benefit of U.S. Provisional Application No. 60/432,479, filed on Dec. 11, 2002, entitled Split Runcard Management System, which application is hereby incorporated herein by reference.

TECHNICAL FIELD

The present invention relates generally to automated processing of semiconductor wafers and more specifically to the use of split runcards for selecting alternate processing steps in such automated semiconductor processing.

BACKGROUND

Modem semiconductor fabrication facilities (often referred to as FABs) typically use MES (manufacturing execution system) to control "Lot" flow equipment operations and proper conditions to achieve fully automated operations. One successful MES solution is the SiView standard system produced by IBM which supports the integration of an AMHS (Automated Material Handling System) and supports use of 300 mm FOUPs (Front Opening Unified Pods) while also maintaining support of a 200 mm carrier system.

A unified pod for processing wafers carefully maintains the purity of a small inside space of the unified pod. Because the purity of the small inside space of the pod is controlled, the purity of the clean room is less critical. Thus, the use of a unified pod saves wafer manufacturing equipment cleaning costs. However, external dust or human body dust may be carried into the manufacturing equipment when opening the cover of the typical unified pod, and thereby contaminate the wafers. A FOUP (Front Open Unified Pod) auto loading structure is suitable for use in the loading-in-interface in a wafer manufacturing process to automatically close/open the cover of a FOUP and thereby help avoid this type of contamination. The FOUP includes a machine base, a carriage, a sliding control mechanism, a clamping mechanism, a horizontal shifting mechanism and a lifting mechanism. The FOUP is put on the carriage and held down by the clamping mechanism. It is then moved in contact with a gate on an axis on a backboard of the machine base. A cover of the FOUP is then opened by a cover close/open control mechanism at the back of the gate. The cover is then carried backward away from the FOUP by the horizontal shifting mechanism and then lowered with the lifting mechanism. The cover is closed on the FOUP when reversing the procedure. The automatic FOUP cover closing/opening operation helps prevent wafer contamination.

The SiView standard system conforms to industry standards and allows for a high degree of changes and interoperability, R&D experiments, STR (special test report) requests, tuning of equipment recipes, etc. Changes in the type, order or parameters of the automated processes for such experiments and STR requests are typically initiated by a "list of new processes," changes in the order of processing, or process parameters which are changed to or in addition to an existing or defined automatic process. This list is often referred to as a "Runcard," or more specifically as a "Split" Runcard. However, such changes as specified by a "Split" Runcard cannot be automatically handled or tracked by the system. Consequently, until the present invention it was necessary that FAB operators manually assign the equipment ID required by a recipe and use a manual mode to process a "Lot" of wafers according to a Split Runcard that deviated from the pre-defined semiconductor processes carried out automatically by an IBM SiView standard system.

SUMMARY OF THE INVENTION

These and other problems are generally solved or circumvented, and technical advantages are generally achieved, by preferred embodiments of the present invention as discussed below.

A method for changing various recipes, order of processing steps and processing parameters used in processing wafers while continuing to maintain an automated process is provided according to this invention. The method comprises providing a multiplicity of wafer processes available for use in the manufacture of semiconductor devices. A first sequence of standard actions or steps is defined for processing a particular "Lot" or group of wafers. The sequence of standard actions or steps comprise selected ones of the multiplicity of wafer processes including at least one specific identified process of the multiplicity. This standard or first sequence of actions is typically defined by a "Runcard." A second sequence of actions is defined by means of a "Split" Runcard. The second sequence of actions also comprises at least one of the multiplicity of the wafer processes as mentioned above. The processing of the wafers is then started at an "initial action" so as to begin the processing of a "Lot" of wafers according to the first sequence of actions. The "Lot" of wafers is adapted for being subdivided into a first group and a second group, and will then move through the various standard processing steps according to the first sequence of actions as defined by the "Runcard" until the processing is interrupted just prior to being subjected to a particular identified process defined by the "Runcard." After being interrupted, the Lot of wafers is separated into a first group and a second group. Processing of the first group of wafers then continues according to the second sequence of actions or the "Split Runcard," after which the first group and second group are rejoined or merged and the processing of the combined first and second groups continues according to the first sequence of actions or standard "Runcard."

According to one embodiment, after the interrupting step and processing of the first group of wafers according to the second sequence of actions or Split Runcard is complete, the second group of the Lot is further processed according to the particular identified process before the first and second groups of wafers are merged.

According to a another embodiment, processing of the second group occurs subsequent to the first group being processed by at least two of the multiplicity of wafer processes and before the merger of the two groups.

According to still another embodiment, the second group of wafers is subjected to at least two processes after the interruption step and before the merging step. Thus, according to this embodiment, at least two processes in the first sequence of steps are replaced by the second sequence of actions or steps used to process the first group of wafers.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other processes for carrying out the same purposes of the present invention. It should

BRIEF DESCRIPTION OF THE DRAWINGS

For a more complete understanding of the present invention, and the advantages thereof, reference is now made to the following descriptions taken in conjunction with the accompanying drawing in which.

DETAILED DESCRIPTION OF ILLUSTRATIVE EMBODIMENTS

Figures 1, 3:
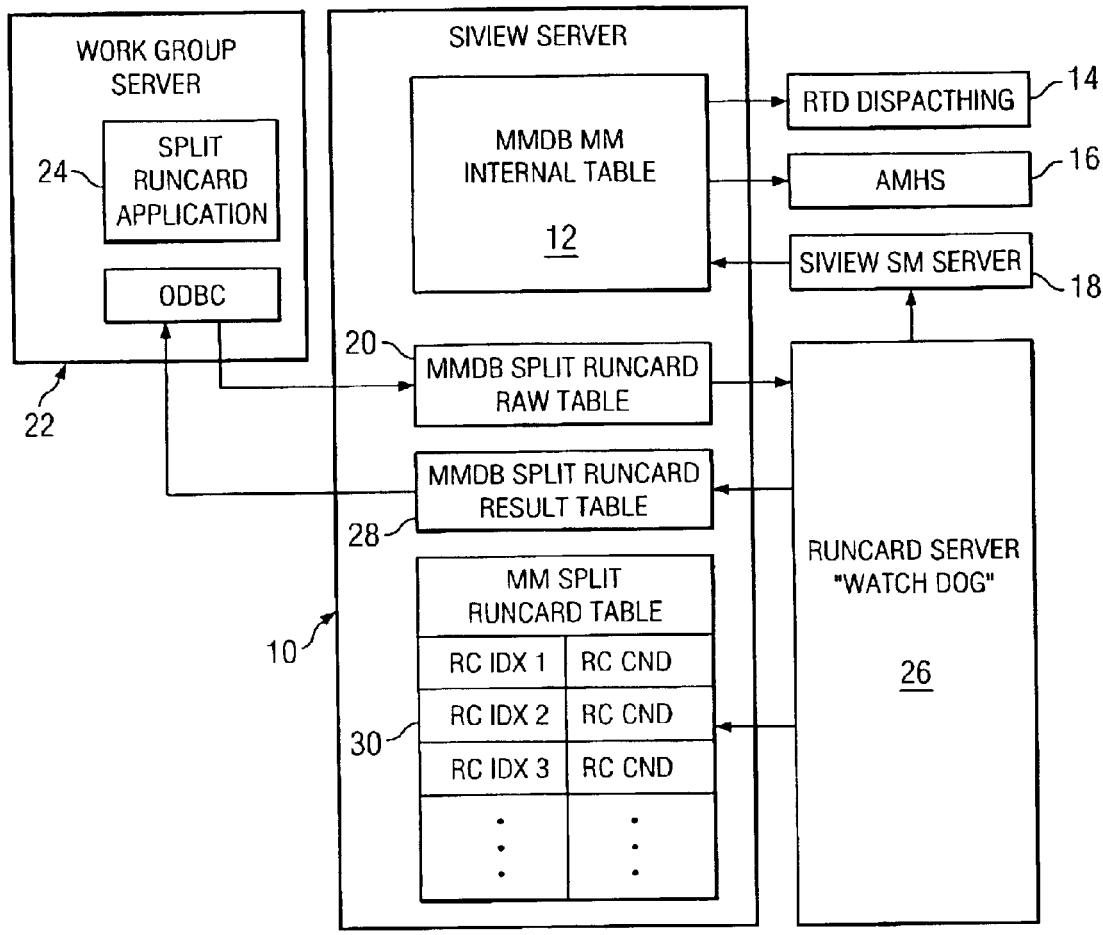
FIG. 1 is a block diagram of a portion of a SiView system (such as IBM) which also incorporates the features of the present invention.
FIG. 3 illustrates a method for determining the order of wafer processing for a "Lot" of wafers being processed according to a Split Runcard or split condition.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to practice the invention, and do not limit the scope of the invention.

The present invention will be described with respect to preferred embodiments in a specific context. As will be appreciated by those skilled in the art, a modern wafer processing plant is comprised of equipment for carrying out a large number of different processes on a wafer or "Lot" of wafers such as for example one or more 300 mm silicon wafers. In addition to including equipment for many various and different processes, it will also be appreciated that it is not unusual for many of the processes (such as for example, masking, etching and depositions) to be required several times during the manufacture of different semiconductor devices. Examples only of a few of the necessary wafer processes include various deposition processes including CVD, Sputtering and Spin-Coating. Likewise, photoresist coating, lithography with many different reticles or masks, converting of the photoresist to a mask and etching are all well-known processes. Further, depending on processes subsequently required by a wafer, it may also be necessary that a process be carried out in a very low contamination environment for some purposes whereas higher contamination levels may be perfectly acceptable for carrying out the same process for other purposes. The particular material recipe of the deposited material, or etching materials and other parameters, may also vary significantly from one operation to another.

Thus, it is seen that a huge amount of data covering the various processes, materials, pressures, temperatures, contamination levels, etc., must be carefully tracked and recorded for any specific automatic manufacturing run. To this end, a predefined order of processing steps for processing a wafer, the material recipes for the various processes, the required equipment and a record of these different parameters is typically developed for a manufacturing run of a semiconductor device. For each manufacturing or production run, this information is listed and controlled by a "Runcard." A "Runcard" will also include specific ID's of the wafers used in the process along with other specific information related to each piece of processing equipment and the materials used such as the manufacturer, date of manufacturing, etc. Consequently, a Runcard is used only once even though the manufacturing process for manufacturing particular semiconductor devices may be used repeatedly. The predefined sequence of actions used to control the equipment ID's and materials required for a particular effective and efficient process may be used for an extended period of time to manufacture thousands and thousands, or even millions of units of a particular semiconductor device. However, as discussed above, since the wafers are different and the other materials are consumable and may be provided by more than one supplier, a new Runcard will be required for each manufacturing run.

In an attempt to continually improve yields and performance of a successful manufacturing process, fine tuning of the materials and process is not uncommon. However, it is very important that a proven successful sequence of steps, material recipes, etc.,not be changed until the process engineer is quite certain that the fine-tuning of the process will yield the desired results. Therefore, if a new experiment or research concerning an altered process or material or request is to be tested, for purposes of control and comparison, it is advantageous to process a "Lot" of wafers in two groups. The first or experimental group will, for example, preferably be processed exactly according to the proven processes and successful sequences of actions except for the specific change that is being tested and evaluated. The second or control group of the "Lot" will be processed along with the experimental group except it will follow the original proven process without exception. Thus, all of the differences and results (good or bad) between the first and second groups will be solely due to the experimental change in the process or recipes.

Prior to the present invention, all experimental process changes to the first group of the wafer Lot were handled by the FAB operator manually assigning recipes, ID's of the equipment and using a manual mode rather than an automated mode to process the wafer Lot according to two different processes. Unfortunately, it is estimated that using a manual mode to process a wafer Lot according to a Split Runcard typically results in a 20% increase in MO's (missed operations). An MO is defined as a FAB operator's mistake that results in the wafer being scraped. Typically mistakes include selecting the wrong equipment and/or material recipes as well as subjecting the wafer Lot to the same process twice (i.e., double processing), etc.

Manual handling of experimental test runs carried out concurrently with a predefined normal manufactured run has also been necessary when using automatic systems. As an example, an MES (manufacturing execution system) using the IBM SiView system to automatically control Lot flow, equipment operations and process conditions for typical manufacturing runs, must still depend on significant FAB operator involvement and manual control of many operational activities. Although a second or "Split" Runcard can be used with the IBM SiView system, to change the process flow or equipment ID's or recipes, the process change will not be fully automatic since the MES will not have all of the necessary information to compensate for the contents of the data related to conditions and instructions for processing. That is, wafer processing controlled by the "Split" Runcard is tracked as a "dynamic branch request" and will follow one or more different processes for specific purposes such as masks, recipes, measurement specifications, etc. Consequently, the process flow and the missing data and information is provided or controlled manually by the FAB operator. Further, after the processes controlled by the "Split" Runcard have been completed, a "Skip" operation is often necessary since the "Split" Runcard may have replaced one or more of the original processing steps. Therefore, if the replaced operation or processes are not skipped the "Split" Runcard wafers will be subjected to double processing and will be scrapped. Thus, it is not uncommon that a "dynamic branch request" causes or results in a large number of problems for the process flow and ends with a large number of processed wafers being scrapped. A major cause of the increased number of problems is that the "Split" Runcard as used by the prior art processes only includes basic equipment data and does not contain or relay all of the necessary definitions and attributes of the temporary processes. The present invention provides a fully automated technique for using a "Split" Runcard which modifies and enhances the MES at the beginning of a process run.

Referring now to FIG. 1, there is a block diagram of a portion of an IBM SiView system incorporating the present invention. As shown, there is a SiView server 10 (available from IBM) including a memory area for an MM (material manager) internal table or DB (database) 12. MMDB 12 exchanges information with the RTD (real time dispatching) 14 and the AMHS (automated material handling system) 16 as received from the SM (specification manager) 18. Another memory area 20 stores Runcard raw table data as received from a first or Split Runcard of this invention to be discussed later. As an example, the process engineer requesting the experimental test run can provide information and data concerning the necessary changes to the FAB operator by means of a message or note on the workgroup server 22 that the process will include a Split Runcard application 24. Likewise, for administrative and management purposes the Split Runcard may include the name of the process engineer, a Runcard ID number, or perhaps even the telephone number of the process engineer in case of need for immediate support. Thus, a Runcard server (workgroup) 26 can be used to act as a control center for informing the FAB operator that the run will include an experimental or test component (i.e., the "Split" Runcard) as well as for releasing processing data to the SM (specification manager) 18 through the ODBC (Open Database Connectivity). Consequently, the Runcard process data will have the same format as the normal process data provided by a split SiView system, since all of the correct attribute data is included. In addition, the Split Runcard will include the necessary information required by the MES (manufacturing execution system) to assure that the wafer run will include two different processing routes (i.e., one for the normal processing and one for the experimental processing). The MM (material manager) server 10 also includes a storage area or table 28 for the Split Runcard results that allow the Runcard watchdog or server 26 to write back to the workgroup server 22 information concerning measurement data. Thus, the Split Runcard raw table 20 and the Split Runcard result table 28 of the MM server 10 can be used as the data exchange interface between the IBM SiView system 10 and the workgroup server 22. The Runcard watchdog 26 also reorganizes and stores the raw Split Runcard information or information received from the workgroup in the MM Runcard table 30 indexed according to the corresponding Runcard. Thus, the data resulting from the conditions set up by the Split Runcard is stored in the appropriate indexed locations.

Thus, the system according to this invention provides benefits such as independent operation of the workgroup server or workstation 22 and the MES which allows the workgroup server 22 to continue operating when the MES is down for maintenance and also allows the MES to continue operating when the workgroup server is down for maintenance. The system of this invention remains fully compatible with the AMHS 16 and RTD 14 which allows the AMHS to automatically transfer wafer LotS and for the RTD to continue real-time dispatching a Split Runcard Lot with a normal or standard Lot.

As an example, the type and flow of proven data of this invention when based on an IBM SiView system is substantially the same as in the unmodified IBM SiView system. Thus, data related to the Split Runcard Lot can be automatically tracked in and out of the system which allows for the full history record of equipment ID's, processing times, wafer quantities, user, recipes and other data to be saved for future analysis which gives the process engineer greater flexibility to record and tune an experiment as necessary. In addition, the rate of fully automatic processing can be increased from 70% to 80% while at the same time reducing the number of scrapped wafers (i.e., MO's). Other advantages include using the workgroup server 22 to support sign-off flow. Separating the MES from the sign-off flow allows the MES to remain focused on the resulting data including the Split Runcard data and keep the system simple. Furthermore, since the workgroup 22 and the MES are independent, it is not necessary to always use the same MES (manufacturing execution system). That is, a process engineer can use the workgroup server 22 to run a follow-up experiment by porting the new Split Runcard data to a different MES. If different ID rules or other parameters are used for the Split Runcard processing data, the variables in the MES can be identified so that other CIM (computer integrated manufacturing) systems can use the data to support or integrate the Runcard Lot data.

Figure 2:
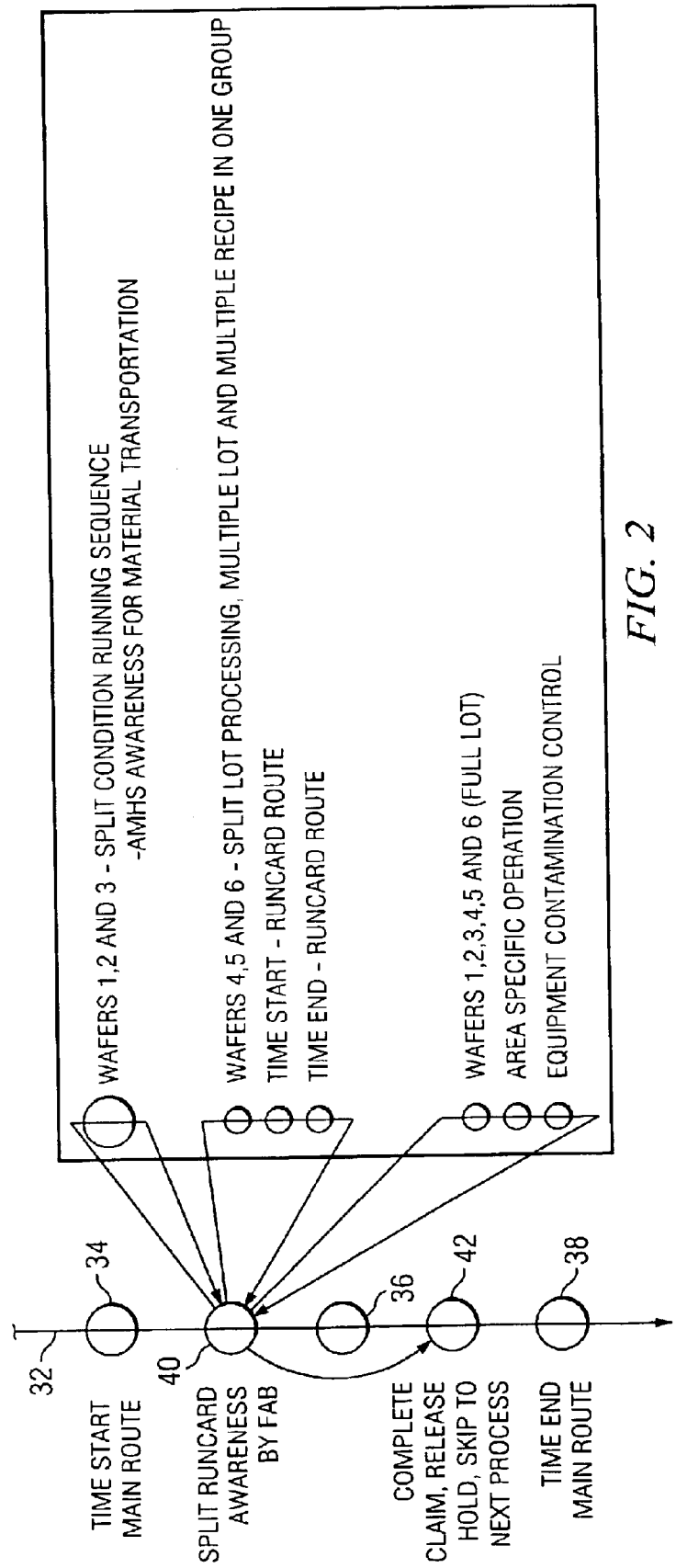
FIG. 2 is a diagrammatic representation of the life cycle of a "Split" Runcard according to the teachings of the present invention.

Referring now to FIG. 2 along with FIG. 1, there is illustrated a Split Runcard life cycle as it interfaces with a normal Runcard or predefined process route. As shown, a portion of a predefined main process route 32 that, as an example only, originally included "time-start" action or step 34, process step 36, and "time-end" step 38 has been changed to also include a "Runcard awareness" or interrupt step or action 40 which puts a portion of the wafer Lot which is to be processed according to the predefined route (i.e., the normal or non-Split Runcard Lot) on "hold" and switches the Split Runcard Lot to a different set of processing steps as will be discussed below. Also included is a "Split Runcard Lot complete" step 42 which also releases the "hold" for the non-Split Runcard Lot so that the non-Split Runcard Lot follows the original processing of the predefined process at step 36 while also skipping the Split Runcard Lot portion past process 36. Thus, when the non-Split Runcard Lot completes the processing step at 36, the two Lots (Split Runcard Lot and non-Split Runcard Lot) are rejoined or merged and the required processing time is noted at the "time-end" step 38.

Parameters that must be considered when generating a Split Runcard include as examples only:

Awareness of a Split Condition and Notice of Completion of Split Condition. It is important to provide a process or method for the process engineer to provide notice or awareness of the Split Runcard to the FAB operator and of course the MES or manufacturing execution system such as indicated at step 40 in FIG. 2. It is also important that once the "Split Runcard" processes have been completed that the MES automatically executes any operations necessary to reposition the Split Runcard Lot to a proper status for subsequent processing. To help accomplish this, the normal or non-Split Runcard Lot processing along a main route will be put in a "hold" status (also as indicated at step 40) just prior to beginning the required processes of the "Split Runcard" processing. As mentioned above, a message advising of the "Split Runcard" may be provided as a "Lot Note" from the process engineer by the workgroup server 22 to the MES. To avoid confusion as to what alternate processing or Split Runcard should be carried out first, a preferred practice is to issue only one "Split Runcard" for a Lot with respect to a specific operation. Once the "Split Runcard" operation has been completed, a "completion claim" or flag is set or triggered to cause the system to automatically skip the main route function or process 36 that is being replaced by the Split Runcard processes.

Split Runcard Execution Sequence. Since the sequence of the various operations or treatments of a wafer is usually critical, and since assuring the proper sequence for both groups of a Split Wafer Lot can be problematic, a good procedure is to execute operations or steps from the smaller number of operations to a large number of operations. For example, referring to FIG. 3 it is assumed that a wafer Lot has wafers with ID numbers 1–10 and the wafer Lot is subdivided or separated into a first group of wafers with ID numbers 1, 3, 5, 7 and 9 and a second group of wafers with ID numbers 2, 4, 6, 8 and 10. Thus, even though the condition 1 indicated at reference numeral 40 which processes wafers 1, 3, 5, 7 and 9 is listed first, condition 2 comprising wafers 2, 4, 6, 8 and 10 indicated at reference numeral 42 should be executed first followed by condition 3 as indicated at 44, which also processes wafers 2, 4, 6, 8 and 10. Condition 1 as indicated at 40, which processes wafers with ID's 1, 3, 5, 7 and 9 is then executed. Finally, condition 4 which processes all of the wafers 1–10 can only be executed after conditions 1–3 have been completed since the operation is used to treat or process all the wafers in the Lot.

Q-Time Management. Since a "Split Runcard" means at least one Lot group must be in a "hold" or "wait" condition while the other Lot group is being processed, the Q-time must be managed to not only allow proper analysis, but also to assure the skip operations occur at the right time or sequence so that the recombined Lot groups are correctly positioned for the next processing step.

Compatibility with Multiple "Lots". For analysis evaluation of test results, it is desirable that a "Split Runcard Lot" be "batched" or run with a normal process or production Lot (i.e., a non-Split Runcard Lot) and when 300 mm FOUP equipment is used, it is possible to process a Split Runcard Lot and a production Lot in the same FOUP if the attributes, such as the route, stage, operation, equipment ID and equipment track recipe of the Split Runcard Lot and the production run Lot are the same. However, since a "production Lot" will be put on "hold" while the Split Runcard Lot is being processed by the alternate sequence of processes, and then the Split Runcard Lot may be required to "wait" while the production Lot is being processed by the original sequence of processes, it is necessary that the equipment controller for the FOUP immediately recognize that the production Lot is on "hold" and the Split Runcard Lot is "waiting" and continue processing along the predefined route. Otherwise, the processing of the combined Lots will simply stop.

AMHS Awareness for Material Transporting. Since the target for 300 mm operations is complete automation, and since the MES will now be upgraded so that it can generate and manage a Split Runcard Lot, the AMHS and dispatching system should also be upgraded to recognize and include the requirements of the Split Runcard Lot while generating the dispatching list.

Determining Contamination Levels. Finally, the contamination level designation or flag of a Split Runcard Lot cannot simply assume the contamination level or flag used by the main route production Lot since doing so could contaminate equipment used for later processing or operations. The Split Runcard Lot contamination level must be compatible with the equipment it requires which may well be different than the equipment used by the production Lot. Consequently, is it is necessary that the MES should include a method for determining the most appropriate level for the Split Runcard Lot contamination flag or level.

Figure 4:
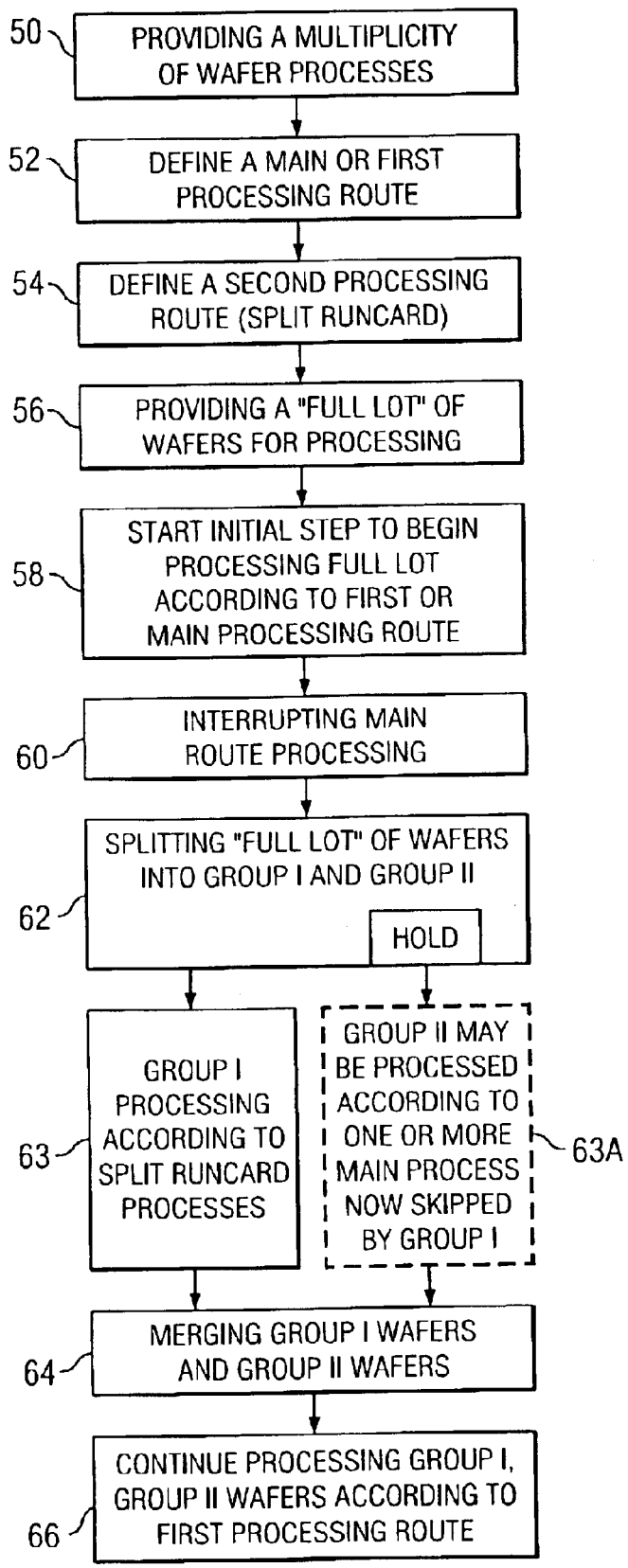
FIG. 4 chart illustrating the process flow of the present invention.

Referring now to FIG. 4, there is a block diagram illustrating Split Runcard processing steps according to one embodiment of the present invention. As shown at step 50, a multiplicity of wafer processes used in the manufacturing of semiconductor devices are provided. A main processing route or sequence of actions or steps including a starting point or initial action and which includes treating or processing a "Lot" or group of wafer with selected ones of a multiplicity of wafer processes in a selected order is defined or set up as indicated at step 52.

A second sequence of actions or steps which includes at least one of the provided multiplicity of wafer processes is defined or set up by a Split Runcard as indicated at step 54, and a multiplicity of wafers or a full "Lot" is provided for processing as indicated at step 56. The full Lot of wafers is suitable or adapted for being subdivided or separated into a first Lot such as an experimental or "Split Runcard" Lot and a second Lot such as a normal production Lot. Processing of the multiplicity or full Lot of wafers is then started at the initial action and follows the first sequence of events or actions as indicated at step 58. At some point along this main route or sequence of actions, the sequence of steps is interrupted before beginning the next processing event as indicated at step 60. Then, as shown at step 62, the full Lot or multiplicity of wafers is subdivided into a first group and a second group and processing of the first group continues according to the "Split Runcard" or second sequence of actions as shown in block 63 while the second group is put into a "hold" condition. After the first group of wafers has completed the steps outlined on the Split Runcard, the second group of wafers may or may not be processed by an original processing step as indicated by block 63A in dotted lines. The two groups of wafers are then rejoined or recombined into the full Lot again as indicated at step 64 and processing of the full Lot continues according to the first sequence of events or the main route as indicated at step 66. As has been mentioned, the processing of group 1 as required by the Split Runcard can comprise one or more processing events which replace a selected identifiable process in the main route or first sequence of actions. In this situation, the Split Runcard sequence of actions will include a command for the group 1 wafers to skip the identified process being replaced and will then "wait" for the wafers of group 2 to complete the identified process before rejoining group 1. Alternately, the processing of group 2 is on hold during the processing of group 1 as required by the Split Runcard or second sequence of actions. Then the groups are rejoined and processing of both groups continues according to the first sequence of events. That is, group 2 experiences all the processing that group 1 experiences as well as any additional processing required by the Split Runcard or second sequence of actions.

Figure 5:
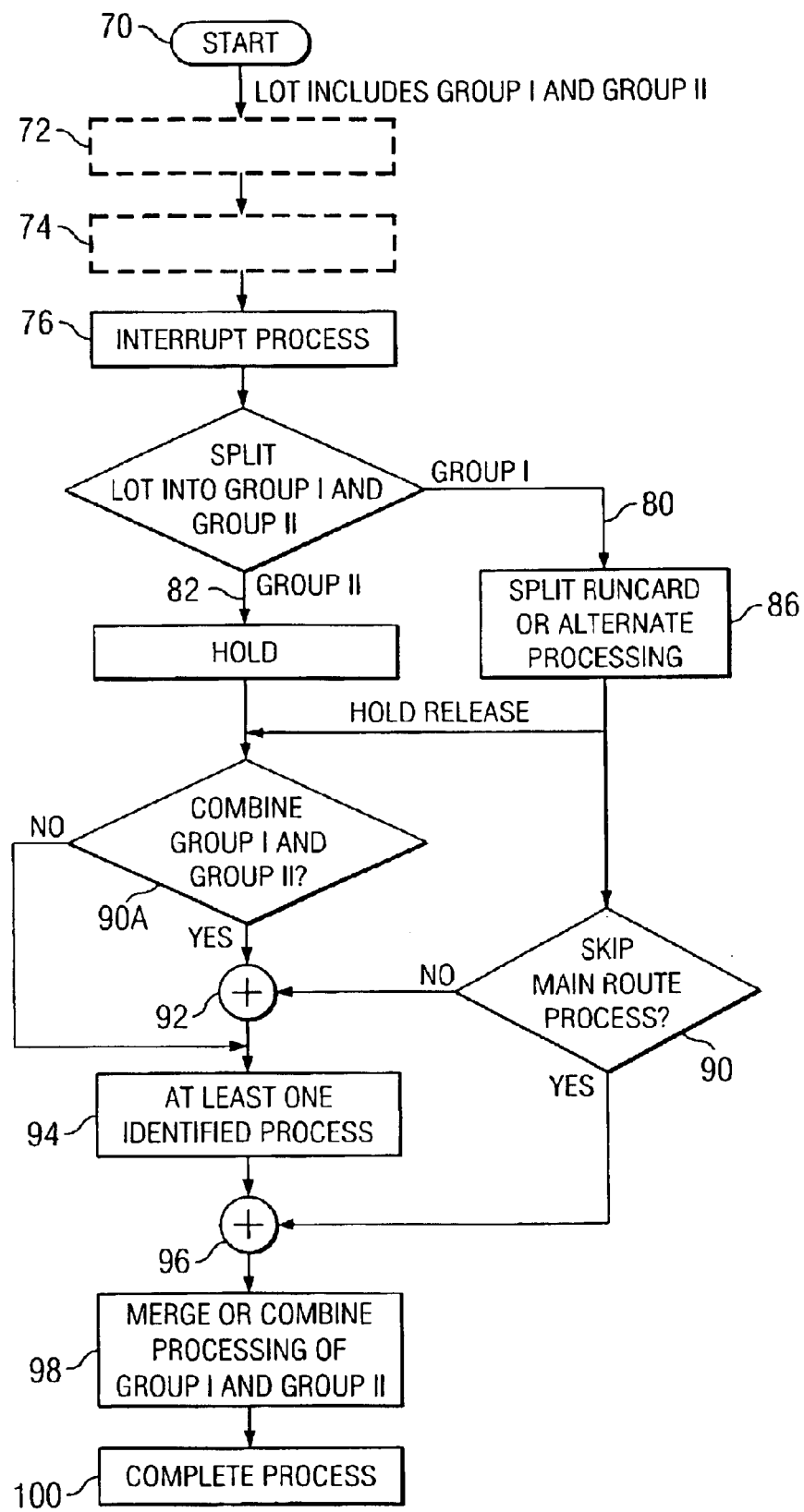
FIG. 5 is a logic diagram illustrating the process of FIG. 2.

Referring to FIG. 5, there is an example of a logic diagram describing the Split Runcard process. It should be noted that the logic diagram of FIG. 5 is provided only to aid in understanding the interaction and operations of a Split Runcard wafer Lot and a main route or production wafer Lot according to the invention. The actual logic processes carried out by an MES system controlled by the IBM SiView standard system may or may not be similar to the logic given as an example in FIG. 5. As shown at starting point 70, a "full Lot" of wafers includes a first group and a second group. This full Lot of wafers may then be subjected to a series of predefined processing steps as indicated at step 72 and 74 in dashed lines prior to encountering an interruption step 76. However, it is possible that the process flow may be interrupted at step 76 before any of the wafers have been subjected to a processing step, That is, there will be no steps 72 and 74 for processing of the wafer Lot. After the predefined process flow is interrupted as indicated at step 76, the alternate process flow proceeds to logic block 78 where the full Lot of wafers is divided into group 1 which follows the Split Runcard process path 80 and group 2 which will follow the original predefined processing steps along path 82. As shown, processing of the non-Split Runcard wafers along path 82 is immediately put on "hold" as shown at step 84. This "hold" condition is maintained until all of the alternate steps as indicated at step 86 are completed at which time a hold release signal on line 88 is provided to hold step 84. At the same time, the alternate path 80 encounters logic block 90 to determine if the wafers in group 1 should bypass or skip one or more processes in the predefined processing or main route. After experiencing the alternate or Split Runcard processing, if the original or predefined processing is required, the first or Split Lot is forwarded to step 92. In a similar manner, group 2 wafers encounter logic block 90A which determines whether group 2 and group 1 should be recombined or merged at this point. If not, the wafers in group 2 continue along the main route and are further processed at step 94. However, if group 1 wafers and group 2 wafers should be recombined or merged, then group 2 is also forwarded to step 92 where groups 1 and 2 are rejoined as a full "Lot" before the processing continues at step 94. However, if group 1 does not require processing by step 94, group 1 of the wafer Lot is moved to step 96 where it "waits" until group 2 completes the required processing at step 94. After processing of group 2 at step 94 is completed, group 2 continues to step 96 where it is then recombined or merged with group 1 and processing of group 1 and group 2 wafer Lots continues according to the first sequence of events of the main route as indicated at step 98 until the processing is completed as indicated at step 100.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, methods and steps described in the specification. As one of ordinary skill in the art will readily appreciate from the disclosure of the present invention, processes, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. In a system for manufacturing a multiplicity of semiconductor devices on wafers according to a predetermined order of processing steps, a method of automatically altering said predetermined order for a first group of wafers in a wafer "Lot" and maintaining said predetermined order of processing steps for a second group of wafers in said "Lot." said method comprising the steps of:
    providing a multiplicity of wafer processes individually selectable for use in the manufacture of semiconductor devices;
    defining said predetermined order of processing steps, said processing steps comprising selected ones of said multiplicity of wafer processes;
    defining a second order of processing steps, said second order of processing steps comprising at least one of said multiplicity of said wafer processes;
    providing a "Lot" of wafers for processing, said Lot adapted for being subdivided;
    processing all of said wafers in said "Lot" of wafers according to at least one processing step of said predetermined order of processing steps; and then
    interrupting the processing of said "Lot" according to said predetermined order of processing steps prior to running a selected one of said multiplicity of wafer processes defined in said predetermined order;
    separating a first group of wafers of said Lot from a second group of wafers of said Lot and processing only said first group according to said second order of processing steps; and then
    merging said first group of wafers with said second group of wafers and continuing processing said merged first and second groups of said Lot according to selected final processes of said predetermined order of processing steps.

2. The method of claim 1 wherein processing of said second group of said Lot continues with processing by said selected one of said multiplicity of wafer processes, and wherein said merging said first group of said Lot with said second group of said Lot occurs subsequent to said second group being processed by said selected process.

3. The method of claim 2 wherein said selected one of said multiplicity of wafer processes comprises at least two of said multiplicity of wafer processes, and said step of merging said first group with said second group occurs subsequent to said second group being processed by said at least two of said multiplicity of wafer processes.

4. The method of claim 1 wherein processing of said second group does not continue until after said merging step, and said step of continuing processing of said first and second groups according to said predetermined order of processes includes processing by said selected one of said multiplicity of wafer processes.

5. The method of claim 1 wherein prior to said merging step, said second group of wafers is further processed by at least one more process step according to said predetermined order of processing steps.

6. The method of claim 1 wherein after said interrupting step said second group of wafers is in a "hold" status and does not undergo further processing until after said step of merging said first and second group of wafers.

7. The method of claim 1 wherein two or more of said plurality of processes are run on different items of provided processing equipment having different contamination levels.

8. The method of claim 1 wherein said system for manufacturing is a Front Opening United Pod (FOUP).

9. The method of claim 8 wherein said FOUP system is controlled by a manufacturing execution system (MES).

10. The method of claim 8 wherein said wafers making up said wafer Lot are silicon wafers having a diameter of at least 200 mm.

11. The method of claim 10 wherein said wafers are at least 300 mm in diameter.

12. The method of claim 1 wherein said predetermined order of processing steps are defined by a "Runcard".

13. The method of claim 12 wherein said second order of processing steps are defined by a Split Runcard.

14. The method of claim 1 wherein said multiplicity of wafer processes are selected from the group consisting of CVD deposition, Sputtering deposition, Spin-Coating deposition, photoresist coating, lithography and etching.

* * * * *